United States Patent [19]

Huber et al.

[11] Patent Number: 5,595,059
[45] Date of Patent: Jan. 21, 1997

[54] COMBINED CYCLE POWER PLANT WITH THERMOCHEMICAL RECUPERATION AND FLUE GAS RECIRCULATION

[75] Inventors: David J. Huber, Orlando; Ronald L. Bannister, Winter Springs, both of Fla.; Mark J. Khinkis, Morton Grove; Josif K. Rabovitser, Chicago, both of Ill.

[73] Assignee: Westingthouse Electric Corporation, Pittsburgh, Pa.

[21] Appl. No.: 397,610

[22] Filed: Mar. 2, 1995

[51] Int. Cl.$^6$ .................. F02C 6/00; F02B 43/00
[52] U.S. Cl. .......... 60/39.02; 60/39.52; 60/39.12; 60/39.182; 122/7 B
[58] Field of Search .......... 60/39.02, 39.55, 60/39.5, 39.511, 39.52, 39.12, 39.182; 122/7 B, 7 R

[56] References Cited

U.S. PATENT DOCUMENTS

| | | | |
|---|---|---|---|
| 3,325,992 | 6/1967 | Sheldon | 60/39.182 |
| 3,738,103 | 6/1973 | Rudolph et al. | 60/39.182 |
| 3,765,167 | 11/1973 | Rudolph et al. | 60/39.182 |
| 3,895,488 | 7/1975 | Koch | 60/39.511 |
| 4,148,185 | 4/1979 | Somers | 60/39.17 |
| 4,315,893 | 2/1982 | McCallister | 422/109 |
| 4,667,467 | 5/1987 | Archer et al. | 60/39.02 |
| 4,785,622 | 11/1988 | Plumley et al. | 60/39.182 |
| 4,900,333 | 2/1990 | Bos | 48/197 R |
| 4,969,324 | 11/1990 | Woodson | 60/39.05 |
| 4,999,993 | 3/1991 | Rao | 60/39.02 |
| 5,133,180 | 7/1992 | Horner et al. | 60/39.12 |
| 5,212,942 | 5/1993 | Malohn | 60/39.07 |
| 5,229,102 | 7/1993 | Minet et al. | 423/652 |
| 5,271,215 | 12/1993 | Guillet | 60/37.5 |
| 5,275,556 | 1/1994 | Hirose | 432/180 |
| 5,319,925 | 6/1994 | Hendriks et al. | 60/39.183 |
| 5,342,702 | 8/1994 | MacGregor | 429/13 |
| 5,431,007 | 7/1995 | Viscovich et al. | 60/39.05 |

*Primary Examiner*—John J. Vrablik
*Assistant Examiner*—Ted Kim
*Attorney, Agent, or Firm*—M. G. Panian

[57] ABSTRACT

Combined cycle power plants are disclosed that utilize a stream of compressed flue gas and fuel that has been passed through a reformer (a thermochemical recuperator) to increase its thermal and chemical value and, along with the output of an air compressor, is fed into the gas turbine combustor. In preferred embodiments the thermochemical recuperation and flue gas recirculation are incorporated into combined cycle power plants that utilize either two gas turbines or reheat gas turbines.

14 Claims, 3 Drawing Sheets

COMBINED CYCLE POWER PLANT WITH THERMOCHEMICAL RECUPERATION AND FLUE GAS RECIRCULATION

The present invention relates to combined cycle power plants and, more particularly, relates to the use of waste heat from the gas turbine exhaust and the flue gas from the steam turbine cycle of the power plant.

BACKGROUND OF THE INVENTION

The generation of electric power is a complex matter, requiring the provision of widely varying amounts of power during various times. Fundamentally, however, maximum efficiencies are achieved by certain operating conditions that are steady state or near-steady state and thus are not compatible with these widely varying demands, particularly in the case of a steam turbine power plant. This problem can be addressed by providing various combinations of plants that are either on standby or running, and although running inefficiently, are smaller and thus waste less energy. Gas turbines are well suited for this latter use because of the ease with which they can be brought on-line. Such solutions, however, require sophisticated control systems to match the power demanded to the power output, bringing standby generators on line as needed, and otherwise managing the power grid.

Combined cycle power generation plants meet the needs of increased efficiency and flexibility because they blend the best features of peaking and base-load generation by combining a steam turbine system with one or more gas turbines. As mentioned above, gas turbines have short start up times and respond well to changes in power demands; they are, however, relatively inefficient for power generation in simple cycle applications. Steam turbines are not well-suited for fast start up and for response to varying demand. Combined cycle plants can achieve better efficiencies by utilizing the waste heat from the exhaust of gas turbines to generate steam for the steam turbine.

Although the heat from the gas turbines is currently used to a certain extent, it is always desirable to further improve the efficiency of the combined cycle plant. Thus, it is an object of the present invention to provide an improved design for combined cycle plants that makes fuller use of the heat generated by one or more gas turbines.

The overall efficiency of gas turbines is a function of the compressor and turbine efficiencies, ambient air temperature, turbine inlet temperature, overall pressure ratio and the type of cycle used. Certain of these conditions are not controlled by the plant layout but by the equipment design, while others are not readily controlled. It is possible, however, to control the temperature of the gas entering the combustor. The higher this temperature, the higher the efficiency of the turbine cycle. Thus, it is a further object of the present invention to increase the temperature of the gas entering the combustor.

Finally, environmental concerns are more important today than ever. The use of a combined cycle plant generates pollutants primarily in the form of $NO_x$ and carbon monoxide (CO). Thus, it is another object of the present invention to provide a system whereby the efficiency of the plant is increased, yet the production of pollutants is reduced.

U.S. Pat. No. 5,133,180—Horner et al. discloses that reformers or chemical recuperators can be used to produce a fuel having significant quantities of hydrogen and water vapor, which is injected into a gas turbine engine to increase performance and produce low emissions. A semi-open cycle gas steam turbine that uses a recuperator is also disclosed in U.S. Pat. No. 5,271,215—Gulliet. A method of increasing the efficiency of a gas turbine and reducing emissions by heating compressed air by passing it through a flue gas heat exchanger is disclosed in U.S. Pat. No. 5,319,925—Hendriks, et al.

SUMMARY OF THE INVENTION

The present invention provides improvements in combined cycle power plants that have a gas turbine connected to a combustor that is connected to an air compressor and a steam turbine cycle connected to a reformer that is connected to the gas turbine by having at least a portion of a flue gas exhaust stream from the steam turbine cycle routed to a flue gas compressor, mixed with a fuel (preferably natural gas), passed through the reformer and along with an exhaust stream from the compressor, entered into the combustor. In preferred embodiments, the stream of reformed gas is either mixed with the exhaust stream from the air compressor at a point outside the combustor, or at a point inside the combustor, but outside a combustion chamber.

The present invention thus provides a combination of thermochemical recuperation and flue gas recirculation useful in many types of combined cycle power plants. In one preferred embodiment, the present invention is incorporated into a system that uses two gas turbines, i.e., the steam turbine cycle comprises one or more economizers and the power plant further comprises a second compressor connected to a second combustor that feeds a second gas turbine, the exhaust of which is connected to the steam turbine cycle. Preferably, at least a portion of a gas stream from the first gas turbine is routed to a flue gas compressor, mixed with a fuel, such as natural gas, is passed through the reformer and, along with an exhaust stream from both the first compressor and the second compressor, enters each combustor. Similarly, in another embodiment, the present invention is incorporated into a reheat system wherein a fuel line is connected directly to the combustor, a low pressure combustor is connected to the turbine, and the low pressure combustor is also connected to the reformer and receives a reformed mixed stream of natural gas and compressed flue gas. Additionally, the low pressure combustor is connected to a low pressure turbine which creates an exhaust stream that is passed through the reformer and into the steam turbine cycle.

More generally, the present invention provides improved reformers, that have a first inlet connected to a gas turbine exhaust, a first outlet connected a steam turbine cycle inlet, a second inlet connected to a flue gas compressor exhaust and a source of fuel, and a second outlet connected to a combustor. In certain embodiments, the second outlet is split to form two lines that are mixed, respectively, with a first and a second air compressor exhaust prior to combustion in a two gas turbine combined cycle power plant. Alternatively, the gas turbine may comprises a low pressure gas turbine in a reheat combined cycle power plant.

The present invention also provides methods of increasing the efficiency of a combined cycle power plant by passing the exhaust of a gas turbine through a reformer before entering a steam turbine cycle, compressing at least a portion of the flue gas from the steam turbine cycle, and mixing it with a fuel such as natural gas to form a mixed stream. The mixed stream is then passed through the reformer and enters the combustor.

DETAILED DESCRIPTION OF THE INVENTION

Power plants made in accordance with the present invention are combined cycle plants, utilizing a gas turbine engine coupled with a steam turbine bottoming cycle, in which a portion the stack exhaust (flue gas) is removed from the stack, compressed, mixed with natural gas, heated, reformed and, along with the exhaust from the gas turbine engine air compressor, enters the combustor.

As the mixture of natural gas and flue gas is heated by the gas turbine exhaust, an endothermic reaction occurs between the natural gas, water vapor, and the carbon dioxide in the flue gas. This reaction results in the production of hydrogen and carbon monoxide. Therefore, the natural gas/flue gas mixture absorbs heat thermally (as it is heated) and chemically (via the aforementioned endothermic reaction), resulting in larger potential recuperation of exhaust energy than can be obtained by conventional recuperation systems which recover energy by heat alone (i.e., thermal recuperation). The present invention thus significantly increases the cycle efficiency and reduces the emissions of the power plant.

The present invention can be utilized with many different equipment configurations, such as reheat gas turbines, or multiple gas turbine engines in which certain turbine engines operate in a semi-closed cycle mode to provide the others with the heated and reformed fuel/flue gas mixture. The heat required for the thermochemical recuperation may be taken from the exhaust, as described above, and/or from the heat of compression of the recirculated flue gas.

As mentioned above, the use of thermochemical recuperation and flue gas recirculation for power generation as disclosed herein allows the design of power plants with efficiencies significantly higher than those of conventional design. This is because the cycles operate with low levels of excess air and heat losses, and the level of recuperation can be increased beyond that which is possible with standard recuperated cycles. Another advantage of the present invention is that because the fuel contains a significant amount of hydrogen and operates with very low levels of excess oxygen in the exhaust, the resulting emissions have much lower concentrations of $NO_x$ than those of conventionally designed power plants.

Figure 1:
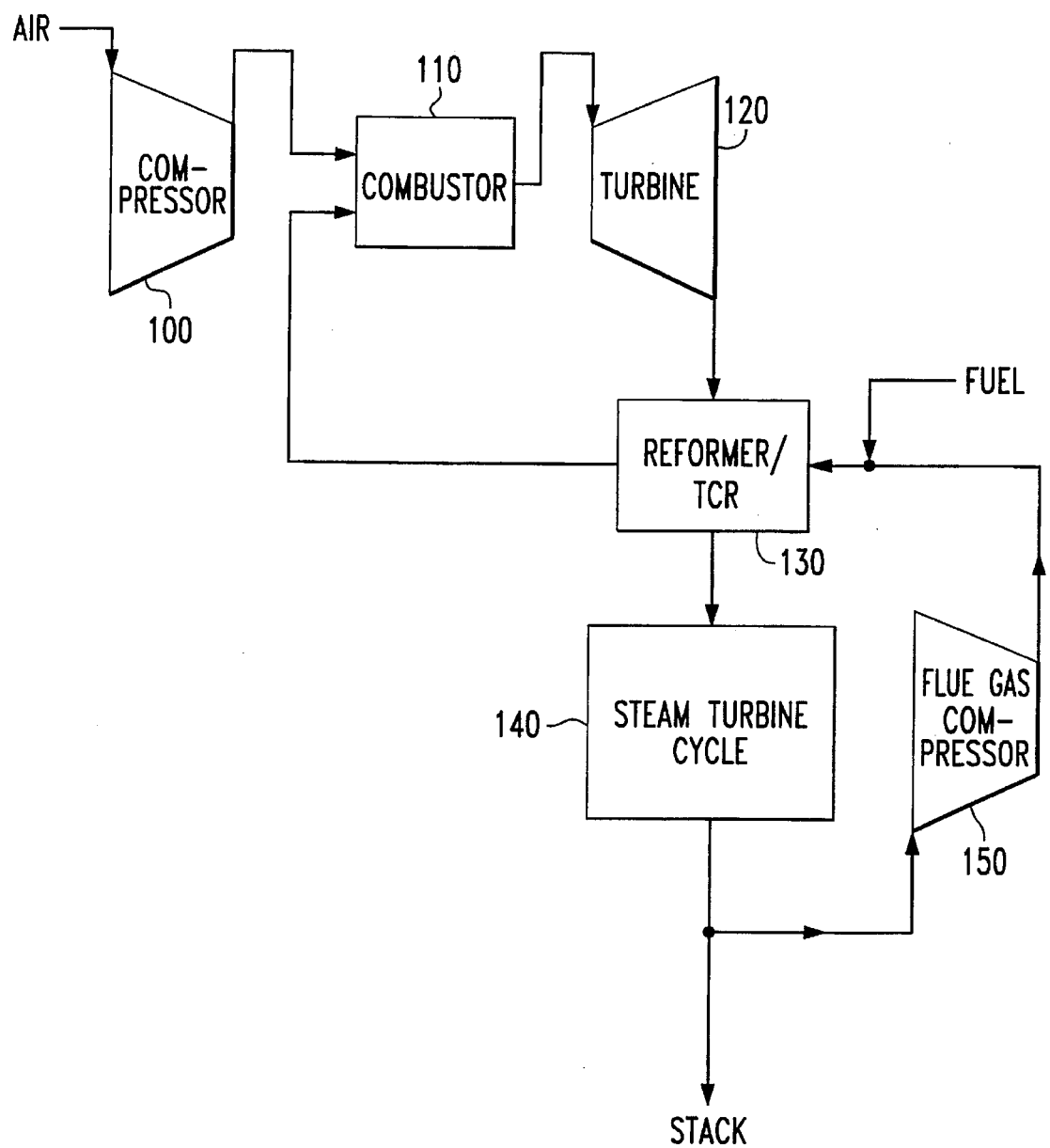
FIG. 1 is a schematic illustration of a combined cycle power plant incorporating thermochemical recuperation and flue gas recirculation in accordance with the present invention.

Referring now to FIG. 1, there is shown combined cycle power plant incorporating both thermochemical recuperation and flue gas recirculation in accordance with the present invention. As in a conventional combined cycle power plant, air enters the air compressor 100, and is compressed and fed to a combustor 110. The combustor 110 mixes the compressed air with a reformed fuel and the mixture undergoes combustion. As explained in further detail below, in the system of the present invention, the fuel is a mixture of reformed natural gas and recirculated flue gas. The exhaust of heated, high pressure gas from the combustor 110 is in turn fed into inlet of a gas turbine 120, and the exhaust exiting from the turbine 120 passed through a reformer 130, or a thermochemical recuperator (TCR) the construction and operation of which is known to those of skill in the art. Generally, a recuperator transfers the heat from combustion products to an incoming, cooler fluid, and thereby increases the efficiency of the system by lowering the fuel consumption, since the combustor receives fuel of a higher thermal value.

The reformer 130 used in the present invention thus creates an exhaust stream from the turbine exhaust that is fed to a steam turbine cycle 140, or bottoming cycle, to recover the remaining energy. A portion of the flue gas from the steam cycle 140 is compressed by a flue gas compressor 150, and the remainder is permitted to exhaust as stack gas. After being compressed, the flue gas is mixed with natural gas, and the combined stream is passed through the reformer 130 where it is heated and reformed by the turbine exhaust gases. The heated and reformed mixed stream of flue gas and natural gas is then fed into the combustor 110, and the exhaust from the air compressor 100 is also fed to the combustor 110. Thus, although illustrated as separate inlets to the combustor 110, the mixed stream exhaust from the reformer 130 is either mixed with the exhaust from the air compressor 100 externally, or within the combustor 110, as illustrated, but prior to entry into the actual combustion chamber.

Figure 2:
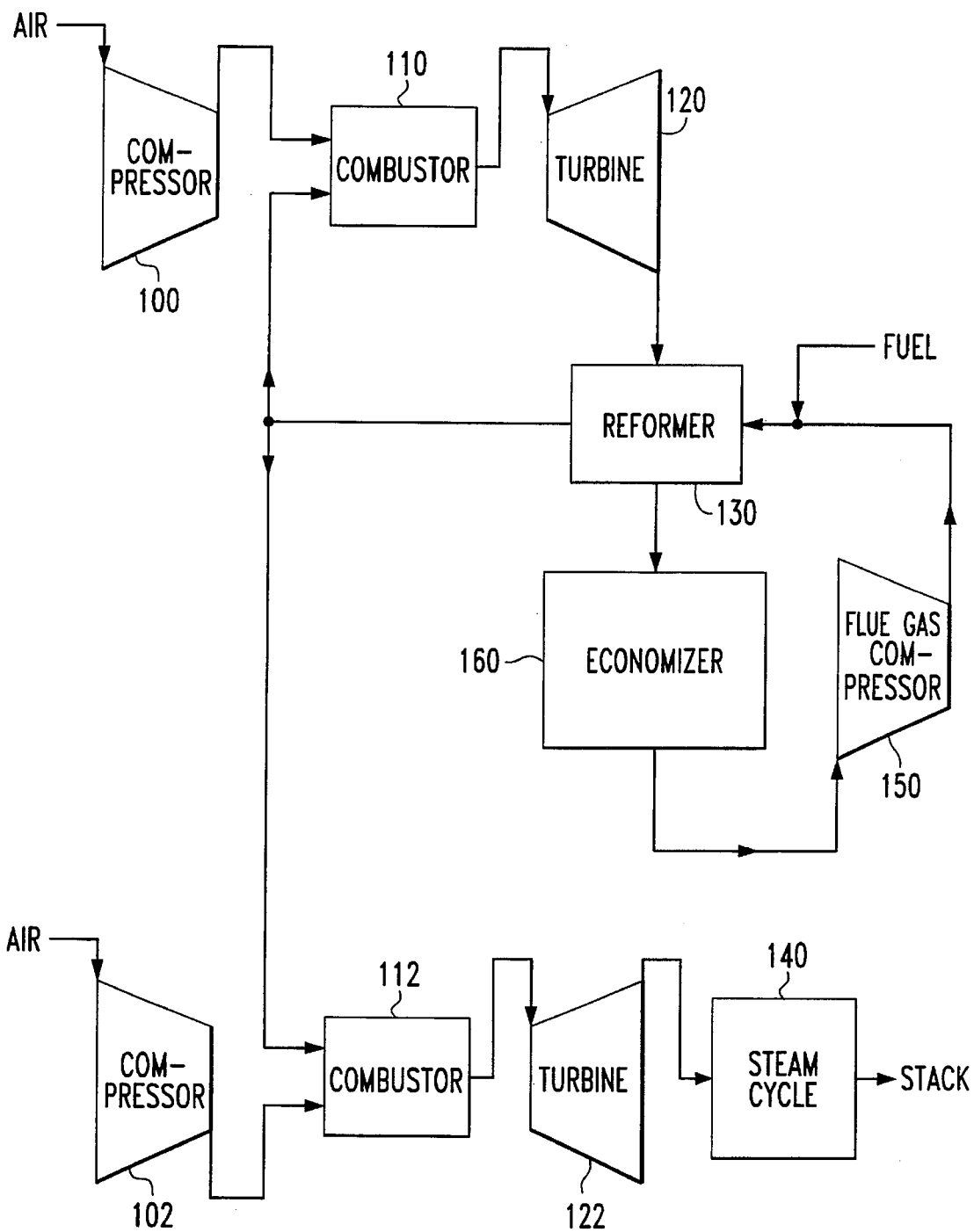
FIG. 2 is a schematic illustration of a combined cycle power plant with two gas turbines incorporating thermochemical recuperation and flue gas recirculation in accordance with the present invention.

The present invention can also be incorporated into a combined cycle power plant that uses two gas turbines, as illustrated in FIG. 2. As in FIG. 1, the embodiment illustrated incorporates both thermochemical recuperation and flue gas recirculation. In FIG. 2, like reference numerals generally represent the same components of the system illustrated in FIG. 1, it will be understood, however, that this does not imply that the systems will actually use identical pieces of hardware, although it is of course possible in some instances to do so. As in the system of FIG. 1, each air compressor 100, 102 compresses an inlet air stream and feeds the compressed air to combustors 110, 112, each of which feeds its respective turbine 120, 122.

One of the turbines 120 is in a semi-closed cycle that produces the reformed fuel for both gas turbines 120, 122. Thus, the exhaust of the turbine 120 passes through a reformer 130, to effect the heat transfer described above with reference to FIG. 1. However, in this embodiment, rather than introducing the exhaust gas that has flowed through the reformer 130 into the steam turbine cycle, the gas exiting the reformer 130 is instead passed through one or more steam turbine cycle economizer(s) 160. As known to those of skill in the art, an economizer is a heat exchange device in which the flue gas temperature is lowered, thereby improving boiler efficiency and saving fuel. The exhaust of the economizer(s) 160 is compressed, in the manner described above, by a flue gas compressor 150 and then is mixed with natural gas before being heated and reformed in the reformer 130. In the embodiment illustrated in FIG. 2, however, the heated and reformed mixed stream is split and along with the exhaust of both the air compressors 100, 102 enters the combustors 110, 112. Thus, the second gas turbine 122 is a conventional combined cycle gas turbine that utilizes the reformed fuel from the first gas turbine 120.

Figure 3:
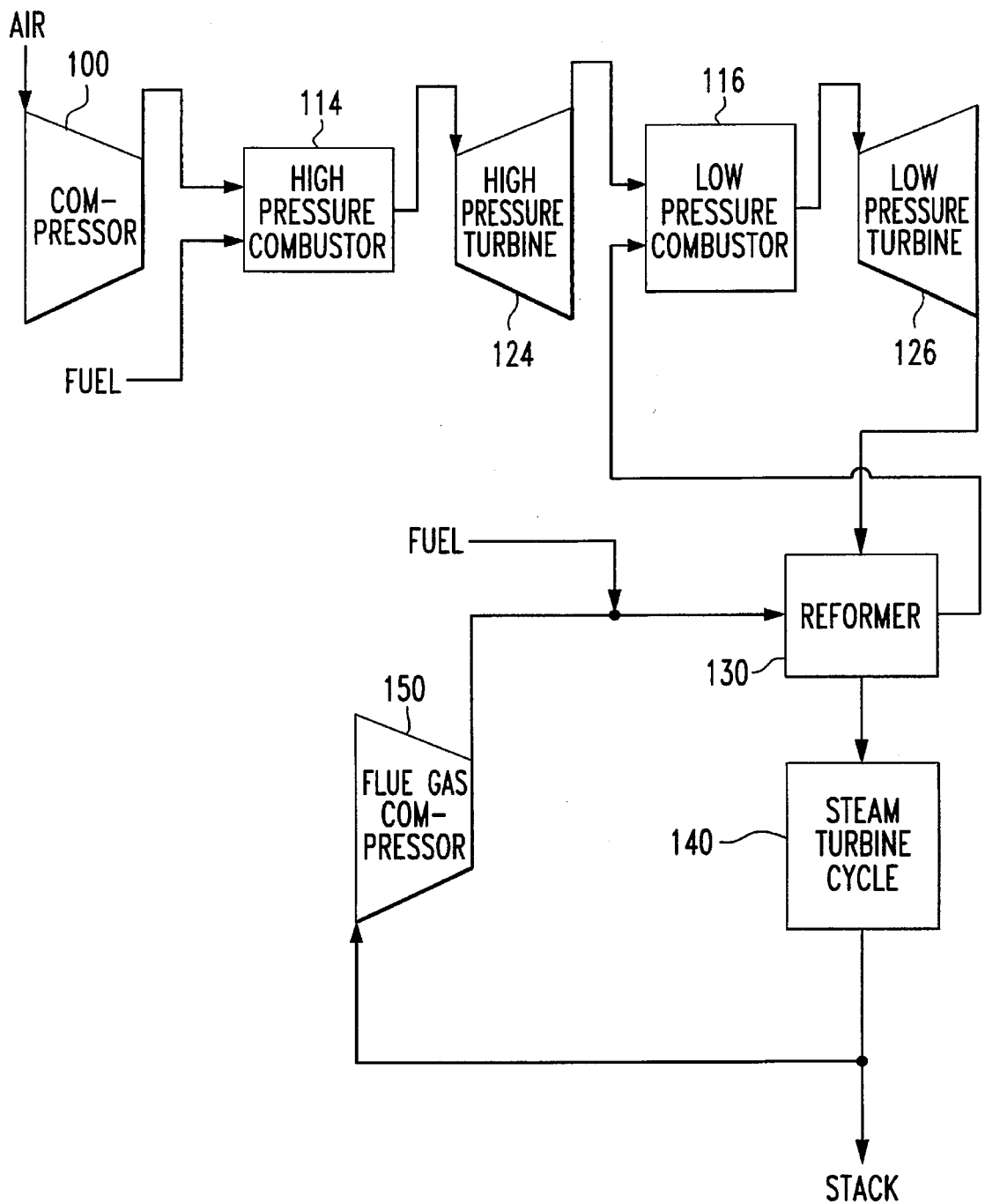
FIG. 3 is a schematic illustration of a combined cycle power plant with a reheat gas turbine incorporating thermochemical recuperation and flue gas recirculation in accordance with the present invention.

Referring now to FIG. 3, another alternate embodiment of the present invention is illustrated which incorporates the thermochemical recuperation and flue gas recirculation seen in FIGS. 1–2 into a reheat gas turbine system. In FIG. 3, like reference numerals generally represent the same components of the system illustrated in FIG. 1, it will be understood, however, that this does not imply that the systems will actually use identical pieces of hardware, although it is of course possible in some instances to do so. As seen in FIG. 3, air again enters an air compressor 100, however, in this embodiment, an inlet stream of natural gas along with the exhaust from the compressor 100 is directly entered into a high pressure combustor 114, and is not mixed with a portion of the flue gas. The exhaust of the high pressure combustor 114 is fed to a high pressure turbine 124, the exhaust of which is fed into a low pressure combustor 116. The low pressure combustor 116 also receives a stream from the reformer 130 that is comprised of heated and reformed natural gas mixed with the a portion of the flue gas from the steam turbine cycle 140 which has been compressed by a flue gas compressor 150, as described above. In other words, the combined stream passes through the reformer 130 and is mixed with the exhaust of the high pressure turbine 124 prior to entry into the low pressure combustor 116. The exhaust of the low pressure turbine 126 passes through the reformer 130, and through the steam turbine cycle, where it exits and is split into a stack exhaust stream and a stream that is compressed and recirculated.

In certain embodiments, the heat of compression generated by the flue gas compressor can be used to provide the heat required for fuel reforming. The use of this heat is either in lieu of or in conjunction with the use of the heat from the turbine exhaust to provide heat for fuel reforming.

It will also be appreciated that intercooling of either or both of the gas turbine air compressor and/or the flue gas compressor may be accomplished either via air-to-water intercooling or by water droplet injection upstream of the compressor or within the compressor. Alternatively, in the case of the flue gas compressor, by reforming the natural gas fuel within the flue gas compressor.

Although certain embodiments of the present invention have been described herein in detail, these embodiments are meant to describe the invention and do not limit the scope of its application. Upon review of these descriptions, numerous modifications, adaptations and variation will present themselves to those of skill in the art. Thus, in order to determine the full scope of the present invention, reference should be made to the appended claims.

We claim:

1. A combined cycle power plant comprising: a gas turbine connected to a combustor that is connected to an air compressor; and a steam turbine cycle connected to a reformer that receives exhaust gas from the gas turbine, wherein at least a portion of a flue gas stream from the steam turbine cycle is routed to a flue gas compressor, mixed with a fuel, heated and reformed in the reformer and along with an exhaust stream from the air compressor is entered into the combustor.

2. The power plant of claim 1, wherein the fuel is natural gas.

3. The power plant of claim 1 wherein the reformer creates a heated, mixed stream of compressed flue gas and reformed fuel, and the heated, mixed stream is mixed with the exhaust stream from the air compressor at a point outside the combustor.

4. The power plant of claim 1, wherein the reformer creates a heated, mixed stream of compressed flue gas and reformed fuel, and the mixed stream is mixed with the exhaust stream from the air compressor at a point inside the combustor, but outside a combustion chamber.

5. The power plant of claim 1, further comprising a second gas turbine, wherein the steam turbine cycle comprises one or more economizers and the power plant further comprises a second compressor connected to a second combustor that feeds a second gas turbine, the exhaust of which is connected to the steam turbine cycle, wherein at least a portion of a flue gas exhaust stream from the economizers is routed to a flue gas compressor, mixed with a fuel, heated and reformed in the reformer, split into two lines and, along with exhaust streams from both the compressors, enters the combustors.

6. The power plant of claim 5, wherein the fuel is natural gas.

7. The power plant of claim 1, further comprising a fuel line connected directly to the high pressure combustor, a low pressure combustor connected directly to the high pressure turbine, wherein the low pressure combustor is also connected to the reformer and receives a heated, mixed stream of reformed natural gas and compressed flue gas, the low pressure combustor also being connected to a low pressure turbine which creates an exhaust stream that is passed through the reformer and into the steam turbine cycle.

8. The power plant of claim 7, wherein the fuel line comprises a natural gas line.

9. A reformer having a first inlet connected to a gas turbine exhaust, a first outlet connected to a steam turbine cycle inlet, a second inlet connected to a flue gas compressor exhaust and a source of fuel, and a second outlet connected to a combustor of the gas turbine wherein the second outlet is mixed with an air compressor exhaust prior to combustion.

10. The reformer of claim 9, wherein the source of fuel comprises a natural gas line.

11. The reformer of claim 9, wherein the second outlet is split to form two lines of reformed fuel which, along with a first and a second air compressor exhaust enters the combustors in a two gas turbine combined cycle power plant.

12. The reformer of claim 9, wherein the gas turbine comprises a low pressure gas turbine in a reheat combined cycle power plant.

13. A method of increasing the efficiency of a combined cycle power plant comprising the steps of passing the exhaust of a gas turbine through a reformer before entering a steam turbine cycle; compressing at least a portion of the flue gas from the steam turbine cycle and mixing it with natural gas to form a mixed stream; passing the mixed stream through the reformer; and entering it with compressed air into a combustor of the gas turbine.

14. The method of claim 13, wherein the step of compressing at least a portion of the flue gas generates heat and further comprising the step of transferring said heat to the reformer.

* * * * *